June 13, 1967     F. DAY ETAL     3,325,263
METHOD AND APPARATUS FOR PRODUCING FOLIATED OR FLAKE GLASS
Filed June 3, 1966     2 Sheets-Sheet 1

INVENTORS
FRANK DAY &
CHARLES J. STALEGO
BY
*Stachiu & Overman*
ATTORNEYS

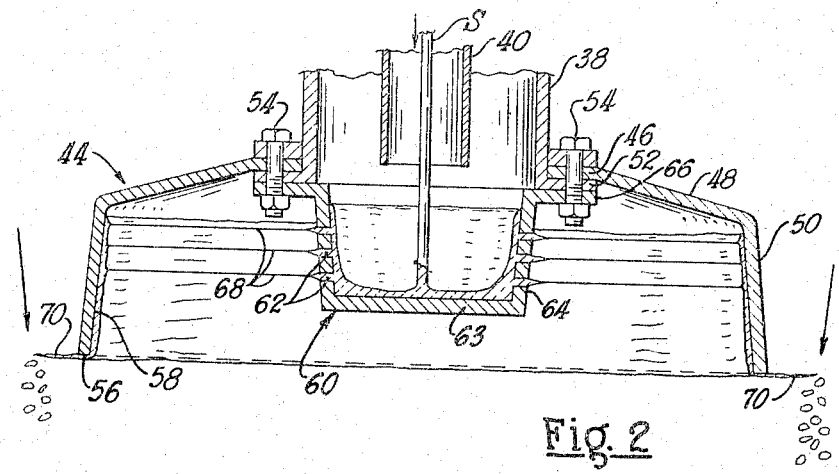
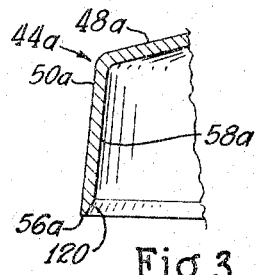
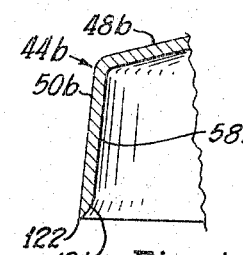
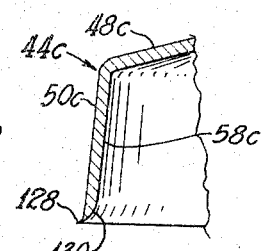

United States Patent Office 3,325,263
Patented June 13, 1967

3,325,263
METHOD AND APPARATUS FOR PRODUCING FOLIATED OR FLAKE GLASS
Frank Day, Granville, and Charles J. Stalego, Newark, Ohio, assignors to Owens-Corning Fiberglas Corporation, a corporation of Delaware
Filed June 3, 1966, Ser. No. 555,174
7 Claims. (Cl. 65—21)

This application is a continuation-in-part of our co-pending application Ser. No. 220,691, filed Aug. 31, 1962, now abandoned.

This invention relates to a method of and apparatus for producing foliated glass and more especially to a method of and apparatus for forming foliated glass in the form of glass flakes through the utilization of centrifugal forces.

Glass film and flakes of glass have been heretofore produced by methods which involve forming molten glass into a comparatively thin walled cylinder and collapsing the cylinder and fracturing the glass film to form glass flakes. One method of this character employed in forming glass flakes is disclosed in United States Patent No. 2,780,889, issued Feb. 12, 1957.

In prior methods of producing foliated glass or glass flakes, the glass is usually formed into a cylindrical shape and collapsed by mechanical means and the collapsed material chopped or served into discrete flakes. By reason of the step of forming the glass into a cylindrical configuration the resulting glass flakes are not flat or planar and hence are unsatisfactory for many purposes.

The present invention embraces the provision of a method of forming heat-softenable material into foliated or flake form utilizing centrifugal forces for forming the softened material into a comparatively thin film which is fracturable and may be broken up or subdivided to form discrete bodies or flakes.

Another object of the invention embraces a method of producing foliated glass by delivering heat-softened glass onto a rotating surface and subjecting the glass to centrifugal forces to form the glass into a planar film which is broken or fractured into discrete flakes of flat or planar configuration.

Another object of the invention resides in a method of forming foliated glass or glass film through the use of centrifugal forces and fracturing the film by a controlled media to promote the formation of discrete flakes of generally uniform size in a particular or desired size range.

Another object of the invention is the provision of an apparatus for centrifuging heat-softened material such as glass in a manner to form the glass in a comparatively thin planar or flat film.

A further object of the invention is the provision of apparatus for forming flake glass wherein the glass is centrifuged into a flat or planar film in a controlled temperature environment, and a controlled media engaged with the film to fracture the film into discrete flakes.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 2 is an enlarged sectional view of a rotor and material distributor employed in the method of the invention;

FIGURE 3 is a detail sectional view illustrating a modified form of rotor configuration;

FIGURE 4 is a detail sectional view illustrating another form of rotor configuration, and FIGURE 5 is a detail sectional view illustrating a further form of rotor configuration.

The apparatus illustrated is particularly adaptable for forming heat-softened material such as glass into film and flake formation, but it is to be understood that the method of the invention and apparatus of the character disclosed may be employed for forming other heat-softened materials into film, flake or foliated form.

Figure 1:
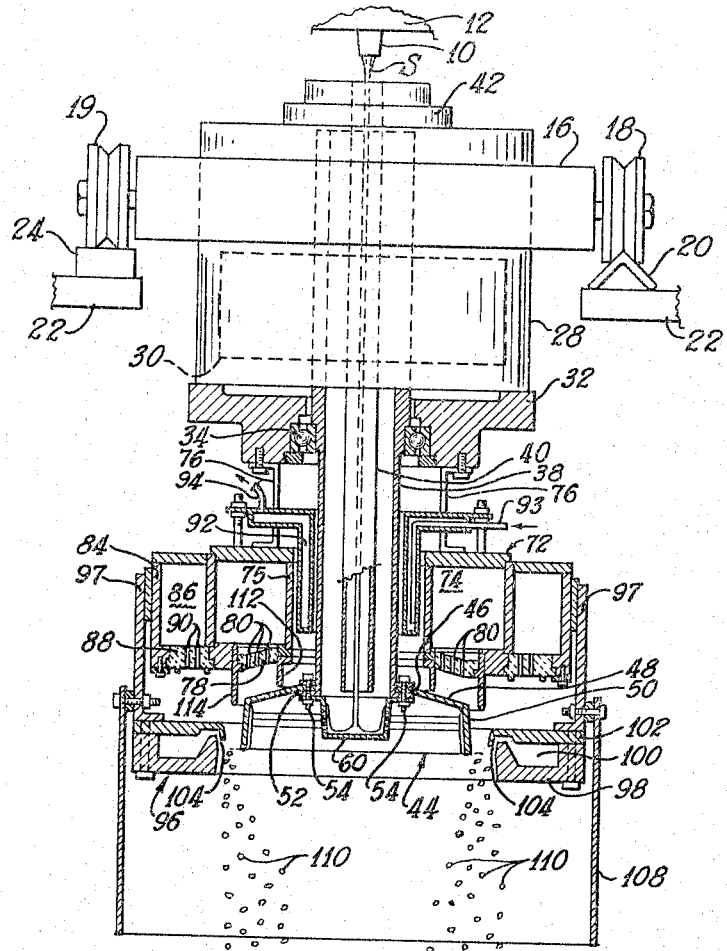
FIGURE 1 is a vertical sectional view of one form of apparatus for performing or carrying out the method of the invention.
Figure 1:
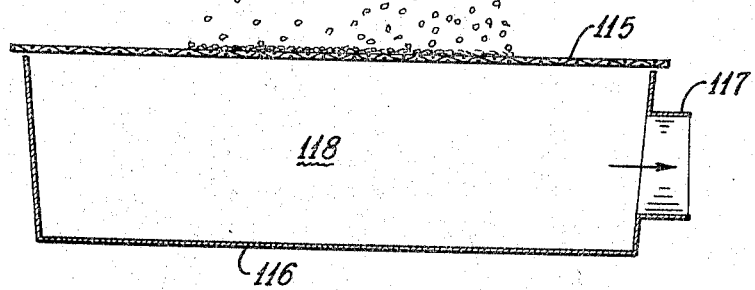

In the embodiment illustrated in FIGURE 1, the apparatus is constructed in the form of a unit which may be employed by itself or in conjunction with other units of the same character whereby foliated glass or glass flakes may be formed and collected in a mass or collected by other suitable methods dependent upon the end use for the product.

The arrangement illustrated in FIGURE 1 is inclusive of a feeder 10 which may be associated or connected with a forehearth 12 containing a supply of heat-softened glass or other film or flake-forming material supplied to the forehearth 12 by a melting furnace or other facility for heat-softening the material. In the arrangement illustrated in FIGURE 1 a single flake forming unit is supported by a carriage 16 provided with grooved pairs of wheels or rollers 18 and 19, the pair of wheels 18 engaging an L-shaped track or guide member 20 mounted upon a support 22, the opposite pair of wheels 19 engaging a track or way 24 carried by the support 22.

The unit is inclusive of a relatively stationary cylindrical shaped housing 28 secured to the carriage 16, the housing enclosing a motor 30 of the electrically energizable type. Secured to the housing 28 is a base plate 32 provided with anti-friction or ball bearings 34. Journally supported upon the bearings 34 and additional anti-friction bearings contained within the housing 28 is a hollow shaft or sleeve 38. Disposed within the shaft 38 is a relatively stationary tube or hollow member 40 carried by supporting plate 42 mounted on the housing 28.

The feeder 10 is provided with an orifice through which flows a stream S of glass or other heat-softened flake-forming material, the stream of material being directed into the tube 40. Mounted upon an end region of the hollow or tubular shaft 38 is a rotor 44 comprising a hub or circular ledge 46, an outwardly and downwardly flared portion 48 and an imperforate peripheral wall 50, the rotor being of hollow configuration. The shaft 38 is provided with an outwardly extending flange 52 which engages the hub 46 on the rotor and supports the rotor from the shaft. Bolts 54 or other suitable means secure the rotor to the flange on the shaft.

As particularly shown in FIGURES 1 and 2, the depending peripheral wall 50 is preferably slightly divergent or frusto-conically shaped, the lower peripheral edge 56 lying in a substantially horizontal plane where the shaft 38 is vertically disposed and rotates about a vertical axis. Means is associated with the rotor 44 for receiving the stream of glass S from the feeder and distributing the molten glass onto the interior surface 58 of the imperforate peripheral wall 50.

As particularly shown in FIGURE 2, the distributor 60 is of cup-like configuration having a bottom or floor 63, a circular side wall 64 and an outwardly extending flange 66, the latter being at the upper region of the distributor and in engagement with the flange 52 of the shaft 38. The bolts 54 also secure the distributor to the shaft.

While the glass distributing means illustrated is in the form of a cup-like member, it is to be understood that other means or media may be employed for distributing the glass into engagement with the rotor wall surface 58.

The peripheral wall 64 of the distributor is formed with circumferentially spaced orifices 62 preferably arranged in vertically spaced rows through which the heat-softened glass or other material in the distribution is projected onto the inner surface 58 of the rotor wall 50. As the distributor 60 is secured to the shaft 38 and the rotor, the distributor is rotated with the rotor and centrifugal forces of rotation project the heat-softened glass in the distributor 60 toward the rotor wall as fine streams or elongated bodies 68.

The material or glass of the stream 68 is collected on the interior surface 58 of the rotor wall 50 and under the influence of centrifugal forces of rotation, the glass of the film on the rotor wall surface 58 moves downwardly and is discharged from the circular edge 56 in the form of a flat or planar film 70 of glass. Under the influence of centrifugal forces, the film 70 in moving outwardly of the rotor becomes extremely thin and is of a thickness of from one-half to two microns or more.

The softened glass or material moving outwardly from the edge 56 of the rotor is attenuated to a thin film without radial fissures occurring because of the molecular adhesion of the attenuable glass.

It is found that the foliated glass, on solidifying at a region spaced from the rotor, tends to fracture or break up into glass flakes which may vary widely in size.

The method and apparatus of the invention is inclusive of temperature and environmental control to promote the fracture or subdivision of the thin film of glass into discrete glass flakes, bodies or fragments which are within a desired size range. As illustrated in FIGURE 1, the shaft 38 is surrounded by an annular burner 72 provided with a walled or confined combustion chamber 74 into which a combustible mixture of fuel gas and air is introduced through suitable means (not shown). The burner 72 is supported by the plate 32 by means of brackets or support member 76.

The lower wall or floor 78 of the burner 72 is provided with a plurality of circumferentially arranged orifices or restricted outlets 80. The combustible mixture admitted into the annular burner chamber 74 is substantially completely burned within the chamber and the products of combustion discharged through the orifices 80 onto the adjacent region of the rotor 44. One purpose of directing heat from the burner 74 onto the rotor 44 is to retard heat loss from the rotor so as to prevent glass"freezing or congealing" in the rotor and maintain the glass is a softened condition to form a film.

In the embodiment illustrated in FIGURE 1, the combustion burner 72 is surrounded by a second combustion burner 84 having an annular combustion chamber 86, the bottom wall 88 having circumferentially spaced orifices 90.

Where additional heat is required in the environment adjacent the rotor, fuel and air mixture admitted into the chamber 86 through means (not shown) is burned within the chamber 86 and the products of combustion discharged into the region below the burner 84. The burner 84 is used under conditions where additional heat is desirable or essential to promote the satisfactory formation of the foliated or film glass.

Disposed between the inner wall 75 of the burner chamber 74 and the shaft 38 is a cooling jacket 92 of annular cross-section, the cooling jacket being adapted to accommodate circulating cooling fluid or coolant such as water. The jacket 92 is provided with a fluid inlet 93 for connection with a source of suitable coolant and an outlet 94. The method of the invention includes the use of a media to effect fracture or fragmentation of the planar film of glass which may be controlled so as to vary the size range of the discrete fragments or glass flakes formed from the film.

With reference to FIGURE 1, an annular blower 96 surrounds the rotor and is spaced radially therefrom to accommodate the outward movement of the film of glass from the rotor. The blower illustrated comprises a body member 98 of annular shape fashioned to provide an annular manifold 100, a cover member 102 being secured to the body member 98 of the blower. The blower construction is fashioned to provide an annular slot or orifice 104 through which gas under pressure in the manifold 100 is delivered into engagement with the outwardly moving glass film from the rotor.

The blower construction 96 is supported by brackets 97 depending from the outermost annular burner 84. A cylindrically shaped guard or sleeve 108 surrounds the blower and depends a substantial distance downwardly with respect to the blower. The manifold or chamber 100 may be connected with a source of gas under pressure such as steam, compressed air or other gas. The mixture pressure in the manifold chamber 74 is comparatively low so that the gases of combustion discharged through the orifices 80 travel at low velocities so as not to impede the outward movement of the glas film from the rotor 44.

The pressure of the gas delivered through the blower orifice 104 is of a value to provide a gaseous blast of a reasonable velocity sufficient to fracture, disintegrate or break up the outwardly moving glass film into discrete flakes 110 and thereby control the formation of glass flakes within a particular size range. It has been found preferable to utilize steam delivered from the blower slot 104 as a media for effecting controlled fracture of the glass film into glass flakes.

Due to the extreme thinness or thin character of the glass film centrifuged from the rotor, the film cools very rapidly to a condition in which it may be readily fractured or broken up into flake form. The gaseous blast from the orifice 104 provides one method of fracturing the film into flake form. The film may be fractured by other suitable means and mechanical means may be employed for accomplishing the purpose.

An air blast from the blower 96 may be employed for controlling the fracturing of the glass film. With certain glass compositions or where films of increased thickness are desired, a comparatively low temperature steam blast or compressed air blast may serve the added function of accelerating the cooling of the film to a fracturable state or condition.

The annular burner 72 is provided with concentric depending skirts 112 and 114 to control the direction of flow of the heated products of combustion from the burner chamber 74 so as to direct the heat onto the peripheral region of the rotor, the skirts or sleeves 112 and 114 serving an additional purpose of restricting induced air flow along the rotor thereby preventing excessive cooling at the environment of the rotor.

While a combustion burner 72 is illustrated in FIGURE 1 as a means for retarding heat loss from the rotor so as to prevent congealing or freezing of the glass within the rotor it is to be understood that other heating means such as high frequency induction heating may be employed to maintain the rotor at a proper temperature.

The glass flakes 110 may be collected in a mass beneath the flake forming unit or they may be utilized directly in processing with other materials. The flakes may be laminated with resinous plastic materials for reinforcing purposes and may be used in combination with other materials for various end uses.

The arrangement illustrated in FIGURE 1 is inclusive of a means of collecting the glass flake in a mass on a suitable support. Disposed beneath the flake forming unit is an endless belt conveyor 115 of the foraminous or reticulated type supported by suitable rolls (not shown) which may be driven so as to advance the conveyor or flake collecting surface to collect the flakes in a mass. The thickness of the collected mass of glass flake may be varied by modifying the speed of advancement of the collecting surface 115.

Preferably disposed beneath the collecting surface or conveyor flight 115 at the region of deposition of the flakes 110 thereon is a receptacle 116 which is connected by means of a tube 117 with a suction blower or other means of establishing atmospheric or reduced pressure in the chamber 118 provided by the receptacle 116.

The reduced pressure in chamber 118 conveys away the gases of combustion from the burner as well as the steam or other film fracturing media from the blower 96, the reduced pressure also influencing the deposition of glass flakes on the surface 115. The glass flakes, being extremely thin are very light, tend to remain suspended in the ambient atmosphere unless effective control is exercised to direct them to a particular region of deposition or collection. The guard 108 serves to reduce turbulence at and beneath the flake forming region as an assist in the collection of the glass flakes.

While the process characteristics and operation conditions may vary dependent upon the glass composition, the viscosity of the heat-softened glass, the throughput of glass and the thickness of the flake desired, the following is a typical working example of operating characteristics and conditions in the formation of glass flake: The glass composition employed in forming flake is disclosed in the Tiede Patent 3,179,739. The heat-softened glass at the region of delivery of the film of glass from the rotor is at a temperature of about 1475 degrees, whereby the viscosity of the glass is approximately one thousand poises. The rotor is eight inches in diameter and is rotated to provide a linear peripheral speed of about six thousand feet per minute. The throughput of glass is three hundred pounds per hour. The blower 96 is supplied with steam at a pressure of fifty pounds per square inch for providing the annular blast for fracturing the solidified film into flake. The steam is delivered from the blower slots at an estimated velocity of about eleven hundred feet per second.

The foregoing environmental and operational characteristics produce glass flakes of an average thickness of about .0016 of an inch. It is to be understood that the thickness of flake may be modified and controlled by varying the peripheral speed of rotation of the rotor and the rate of feed or throughput of glass from the rotor.

While the preferred peripheral speed for the rotor is about six thousand feet per minute, flake may be produced at peripheral linear speeds of the rotor of between five thousand and seven thousand feet per minute. The thickness of the mobile film of heat-softened glass at the spinner edge should be between four and eight times the thickness of the flake desired. While the above example of environment and operating conditions are applicable for a particular glass composition, it is to be understood that other glass compositions may be used and the temperature of the glass of the film may be varied accordingly.

FIGURE 3 illustrates a modified shape for the glass discharge edge surface of the rotor. In this form, the rotor 44a is fashioned with an imperforate substantially vertical peripheral wall 50a and an angularly arranged upper wall 48a. In this form, the terminal region or distal edge configuration of the rotor wall 50a is fashioned with a frustoconically shaped or beveled surface 120 connecting the interior wall surface 58a and a comparatively narrow circular edge 56a which is of planar or flat configuration.

The frusto-conically shaped surface 120 under certain operating conditions facilitates more smooth flow of glass onto the edge 56a and away from the edge under the influence of centrifugal forces. The arrangement shown in FIGURE 3 tends to prevent wetting of the exterior surface of the rotor wall 50a by the molten glass at its junction with the edge surface 56a. If the surface 50a becomes wetted by the glass, some of the glass would tend to adhere to the exterior surface of the wall 50a in the region of the edge surface 56a and impair the formation of the glass film.

FIGURE 4 is illustrative of another form of glass discharge region for a rotor to minimize the tendency of wetting of the exterior peripheral wall of the rotor. In this form, the rotor 44b is fashioned with an imperforate peripheral wall 50b joined with an angularly arranged upper wall 48b.

The glass is delivered outwardly from the rotor under the influence of centrifugal forces from an edge 122, resembling a knife edge, an outwardly curved surface 124 forming a transition region for conveying the glass from the interior surface 58b of the rotor wall to the discharge edge 122 of the rotor.

FIGURE 5 illustrates a modified configuration of glass discharge region of the rotor which may be employed to minimize the tendency of the glass to wet the exterior rotor wall surface adjacent the discharge region. In this form, the rotor 44c is fashioned with an imperforate peripheral wall 50c joined with an angularly arranged upper wall 48c. The edge region of the wall 50c, from which the glass is discharged under the influence of centrifugal forces of rotation, is fashioned with an outwardly extending circumferential projection 128, the circular projection 128 being in the form of a circular knife edge which is joined with the interior surface 58c of the rotor wall by a curved surface 130.

It is apparent that, within the scope of the invention, modifications and different arrangements may be made other than as herein disclosed, and the present disclosure is illustrative merely, the invention comprehending all variations thereof.

We claim:

1. The method of processing heat-softenable film-forming material comprising the steps of engaging heat-softened material with a surface, rotating the surface, projecting the heat-softened material from the surface by centrifugal forces of rotation to form a comparatively thin film of the material, and fracturing the film at an annular region spaced from the surface into discrete flakes.

2. The method of processing heat-softenable film-forming material comprising the steps of engaging heat-softened material with a surface defined by a circular edge, rotating the surface, projecting the heat-softened material from the circular edge of the surface by centrifugal forces of rotation of the surface to form a comparatively thin film of the material, and engaging the film at an annular region spaced from the surface with a media to fracture the film into discrete flakes.

3. The method of processing heat-softenable glass comprising delivering glass into a chamber having a circular edge, heating the chamber, rotating the chamber, projecting the glass from the circular edge of the chamber by centrifugal forces of rotation to form a comparatively thin film of glass, and engaging the film with a gas stream at an annular region spaced from the circular edge to subdivide the film into discrete flakes.

4. Apparatus for processing heat-softenable film-forming material including, in combination, a rotatable member terminating in a circular edge, means arranged to direct heat-softened material into engagement with the circular edge, means for rotating the member at a speed to project the material from the circular edge by centrifugal forces in the form of a film of the material, and means for directing a film-fracturing media into engagement with the film at an annular region spaced from the circular edge to effect fracture of the film into discrete flakes.

5. Apparatus for processing heat-softenable material including, in combination, a rotatable member terminating in a circular edge defined by converging surfaces, means for heating said member, means arranged to direct material into engagement with the member, means for rotating the member at a speed to project the material by centrifugal forces from the circular edge in the form of a comparatively thin film of the material, and means engageable with the film at an annular region spaced from the circular edge to effect fracture of the film into discrete flakes.

6. Apparatus for processing glass including, in combination, a rotatable hollow rotor terminating in a circular edge, means for heating the rotor, means arranged to direct heat-softened glass into engagement with the rotor, means for rotating the rotor at a speed to project the heat-softened glass from the circular edge in the form of a comparatively thin film, and means directing a gas stream in an annular region concentric with and spaced from the circular edge into contact with the film to effect fracture of the film into discrete flakes.

7. Apparatus for processing heat-softened glass including, in combination, a rotatable hollow rotor having an outwardly flared interior surface terminating in a circular edge, means for heating the rotor, a walled distributor chamber disposed within the rotor to receive heat-softened glass from a supply, said walled chamber having discharge regions for distributing heat-softened glass from the chamber into engagement with said flared interior surface of the rotor, means for rotating the rotor at a speed to project the heat-softened glass from the circular edge, and means directing a gas stream in an annular region concentric with and spaced from the circular edge into engagement with the heat-softened glass to form the glass into discrete bodies.

References Cited

UNITED STATES PATENTS

| | | | |
|---|---|---|---|
| 2,646,593 | 7/1953 | Downey | 64—14 |
| 3,022,538 | 2/1962 | Setterberg | 65—14 |
| 3,097,085 | 7/1963 | Wallston | 65—15 |

S. LEON BASHORE, *Acting Primary Examiner.*

R. L. LINDSAY, *Assistant Examiner.*